9274X
Atkinson & Hale.
Raising Sunken Vessels.
Patented Dec. 2, 1835
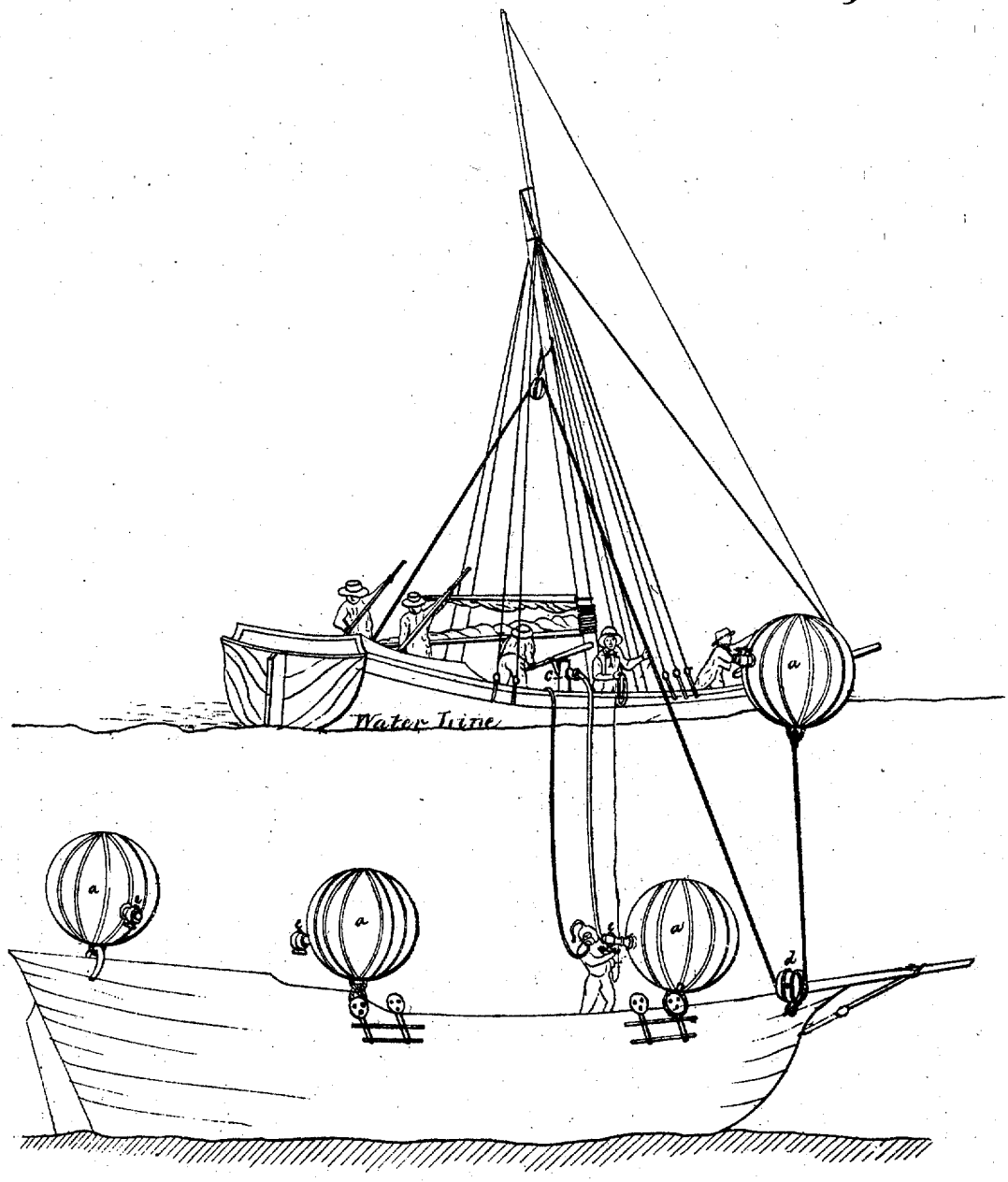

Wm. Atkinson of Newyork and Ebenezer Hale city county and State of Newyork (743)

Letters Patent

The schedule referred to in these Letters Patent and making part of the same, containing a description in the words of the said Willm Atkinson and Ebenezer Hale themselves of their improvement in raising sunken vessels, & other articles from the bottom of Rivers, Seas Bays and other Waters and which may also be employed to prevent the sinking of such vessels or other articles, and that the following is a full and correct description thereof.

We prepare Bags which are impervious to air & water and to them we attach hose or tubes properly prepared and of such length as may be necessary for the intended purpose - The most effectual way of preparing such Bags and Hose is by coating canvass or other cloth of sufficient strength with Caoutchouc or Indian rubber in a manner now well known - The forms of the bags may be varied, but the best is that of a globe when they are distended by filling them with air as more will be contained under the same bulk than in any other form The Bags should be properly strengthened by bands of canvass or cordage and be sunk in the water and firmly attached to the vessel or other article to be raised which may be done by means of a diving Bell or in any other way which particular circumstances of the case may render convenient - The hose or tubes leading to each Bag must be of sufficient length to extend from it to the apparatus by which the bag is to be inflated which may be on board of a moored vessel or otherwise - The distending apparatus will consist of a common condensing or Force pump by which the air may be forced through the hose or tube so as to distend the Bag - It may sometimes be found convenient and we intend to fill the bags before sinking them, proper tackle and blocks being attached to, or passed under the vessel or other article to be 92 14X raised – The inflating of the Bags may in this case be rapidly effected by the use of large common bellows – We intend also to use such bags so inflated within the Hold, cabin or other parts of vessels, which when not wanted will occupy but little space, and when required may be easily inflated by a pair of bellows adapted to that purpose. In all cases suitable, air tight valves or Corks should be employed and such other appendages as may be found useful for coupling the inflating apparatus or otherwise when securing the air with the bag —

It is not necessary for us to prescribe the size or number of bags to be employed nor indeed would it be possible to do so without assuming a particular case, but it is manifestly a thing of easy calculation & one which must be made in every individual instance – What we claim as our invention and wish to secure by Letters Patent is the employment of Bags rendered impervious to air and water and furnished with hose or tubes, cocks or valves, through which they can be filled with air after being sunk and properly secured to a vessel or any other article intended to be raised from the bottom to the surface of any water or when first distended and afterwards sunk as herein described. We also claim their use or employment for preventing the sinking of vessels or other articles as set forth by us –

Witnesses to the Signature
of William Atkinson
Henry Done }
J. T. Bayard }

William Atkinson

Witnesses to the Signature
of Ebenezer Hale
Jacob. J. Fente }
William H. Bird }

Eben Hale –

Exd. [illegible]

(Patented Dec 2nd 1835)

(696 words)

(Drawings made from Specification)